(12) United States Patent
Wang et al.

(10) Patent No.: US 10,979,542 B2
(45) Date of Patent: Apr. 13, 2021

(54) FLOW CACHE SUPPORT FOR CRYPTO OPERATIONS AND OFFLOAD

(71) Applicant: VMware, Inc., Palo Alto, CA (US)

(72) Inventors: Yong Wang, San Jose, CA (US); Xinhua Hong, Campbell, CA (US); Jayant Jain, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 74 days.

(21) Appl. No.: 16/114,987

(22) Filed: Aug. 28, 2018

(65) Prior Publication Data
US 2020/0076928 A1    Mar. 5, 2020

(51) Int. Cl.
| | |
|---|---|
| *H04L 29/06* | (2006.01) |
| *H04L 12/747* | (2013.01) |
| *H04L 12/741* | (2013.01) |
| *H04L 29/08* | (2006.01) |

(52) U.S. Cl.
CPC .......... *H04L 69/22* (2013.01); *H04L 45/742* (2013.01); *H04L 45/745* (2013.01); *H04L 63/0485* (2013.01); *H04L 63/062* (2013.01); *H04L 69/324* (2013.01)

(58) Field of Classification Search
CPC ..... H04L 69/22; H04L 45/742; H04L 45/745; H04L 63/0485; H04L 63/062; H04L 69/324
See application file for complete search history.

(56) References Cited

U.S. PATENT DOCUMENTS

| | | | |
|---|---|---|---|
| 8,037,530 B1 * | 10/2011 | Fink ............... | H04L 9/0841 726/23 |
| 8,191,134 B1 | 5/2012 | Thangavelu | |
| 2004/0128553 A1 * | 7/2004 | Buer ............... | H04L 63/045 713/154 |
| 2004/0146044 A1 * | 7/2004 | Herkerdorf ....... | H04L 45/30 370/351 |
| 2005/0076228 A1 * | 4/2005 | Davis ............. | G06F 21/72 713/188 |
| 2005/0089030 A1 * | 4/2005 | Wilson ............ | H04L 69/161 370/389 |

(Continued)

FOREIGN PATENT DOCUMENTS

WO    2008044581 A1    4/2008

*Primary Examiner* — Walter J Divito
*Assistant Examiner* — Camquyen Thai
(74) *Attorney, Agent, or Firm* — Patterson + Sheridan, LLP (57) ABSTRACT

Certain embodiments described herein are generally directed to using a flow cache with packets comprising dynamic headers. Embodiments include receiving a packet of a packet flow from a network, parsing the packet in order to determine a flow key, and comparing the flow key to entries in the flow cache. Upon determining that the flow key does not match any of the entries, embodiments include determining whether the packet comprises a dynamic header. Upon determining that the packet comprises a dynamic header, embodiments include canceling recorded flow cache information for the packet, performing an operation on the packet, re-parsing the packet in order to determine a new flow key, and comparing the new flow key to the entries in the flow cache. Upon determining that the flow key matches an entry, embodiments include determining cached actions to perform for the packet based on the entry and performing the cached actions.

20 Claims, 3 Drawing Sheets

(56) References Cited

U.S. PATENT DOCUMENTS

| | | | |
|---|---|---|---|
| 2007/0258468 A1* | 11/2007 | Bennett | H04L 63/0464 370/400 |
| 2010/0268935 A1* | 10/2010 | Rodgers | H04L 63/164 713/153 |
| 2014/0050223 A1 | 2/2014 | Foo et al. | |
| 2014/0053239 A1* | 2/2014 | Narayanaswamy | H04L 63/0245 726/1 |
| 2014/0254605 A1* | 9/2014 | Anumala | H04L 45/38 370/401 |
| 2015/0026794 A1* | 1/2015 | Zuk | H04L 45/64 726/13 |
| 2015/0106420 A1* | 4/2015 | Warfield | H04L 41/5041 709/201 |
| 2015/0194215 A1* | 7/2015 | Douglas | G11C 15/04 711/108 |
| 2016/0105471 A1* | 4/2016 | Nunes | H04L 12/4633 709/228 |
| 2017/0339109 A1* | 11/2017 | Zeng | H04L 29/06 |
| 2018/0262599 A1* | 9/2018 | Firestone | G06F 9/45558 |
| 2019/0158387 A1* | 5/2019 | Chen | H04L 45/54 |
| 2019/0312808 A1* | 10/2019 | Sonthy | H04L 45/72 |

* cited by examiner

FLOW CACHE SUPPORT FOR CRYPTO OPERATIONS AND OFFLOAD

CROSS-REFERENCE TO RELATED APPLICATIONS

The subject matter of this application is related to the subject matter in United States patent application entitled "DATAPATH CACHE," having Ser. No. 14/929,434, filed on 2 Nov. 2015, the contents of which are hereby incorporated by reference.

BACKGROUND

Networks, such as software defined networks (SDNs), generally include gateways, which are network points that act as entrances to the networks. In a network provided by a datacenter, a computing resource, such as a physical computing device or a virtual computing instance running on a physical computing device, assigned to be a gateway generally facilitates and regulates traffic between the datacenter network and an external physical network. Gateways are typically associated with routers, which know where to direct a given packet of data that arrives at a gateway, and switches, which furnish the actual path in and out of the gateway for a given packet. Gateways may also provide various network traffic services, such as firewall, network address translation (NAT), and services related to packet encryption/decryption (e.g., internet protocol security (IPSec) services).

For a given packet, a gateway generally determines a series of actions to perform in order to process the packet as part of a "slow path" pipeline. The gateway may, for example, determine the series of actions dynamically based on the contents of the packet, such as header information including source address, destination address, port information, etc. For example, the gateway may access configuration data (e.g., routing tables and/or forwarding tables) and/or rules (e.g., firewall rules) stored in a data store and use the configuration data and/or rules to determine what actions to apply to a packet, such as based on the header information contained in the packet. Rather than processing a packet using the "slow path" for every packet in a flow, the gateway may store information indicating the series of actions determined for the first packet of a flow, along with information from the header of the first packet, as an entry in a flow cache so that a "fast path" may be used for subsequent packets in the flow based on the flow cache. For example, when a subsequent packet is received, the gateway checks the flow cache to see if the header information in the subsequent packet matches the entry in the flow cache. If so, the gateway performs the series of actions on the subsequent packet associated with the header information in the flow cache. Using a flow cache is described by the application entitled "DATAPATH CACHE," referenced above.

SUMMARY

Herein described are one or more embodiments of a method for using a flow cache with packets comprising dynamic headers. The method generally includes receiving a packet of a packet flow from a network; parsing the packet in order to determine a flow key; comparing the flow key to entries in the flow cache; upon determining that the flow key does not match any of the entries: determining whether the packet comprises a dynamic header; upon determining that the packet does not comprise a dynamic header: determining one or more actions to perform for the packet; and generating an entry for the packet in the flow cache comprising the flow key and the one or more actions; or upon determining that the packet comprises a dynamic header: canceling recorded flow cache information for the packet; performing an operation on the packet; re-parsing the packet in order to determine a new flow key; and comparing the new flow key to the entries in the flow cache or upon determining that the flow key matches an entry of the entries: determining cached actions to perform for the packet based on the entry; and performing the cached actions on the packet.

Also described herein are embodiments of a computer system, wherein software for the computer system is programmed to execute the method described above for using a flow cache with packets comprising dynamic headers.

Also described herein are embodiments of a non-transitory computer readable medium comprising instructions to be executed in a computer system, wherein the instructions when executed in the computer system perform the method described above for using a flow cache with packets comprising dynamic headers.

DETAILED DESCRIPTION

Embodiments presented herein relate to systems and methods for using a flow cache with packets that comprise dynamic headers. A dynamic header generally refers to a header of a packet that is fully or partially obscured or inconsistent over time, such as through encryption or because the packet is dispatched to an entity, such as via a KNI (Kernel NIC (Network Interface Controller) Interface), that performs additional processing that may result in changes to the header. For example, an inbound packet (e.g., inbound to the datacenter) that is encrypted has a dynamic header because the packet's header will change after the packet is decrypted. An outbound packet that requires encryption has a dynamic header because the packet's header will change after the packet is encrypted. A packet that is dispatched to additional entities (e.g., via KNI), such as to perform load balancing or other operations (e.g., service insertion operations wherein a service is added into the forwarding path of the packet) that may result in changes to the header, has a dynamic header because it is not known whether the packet's header will change after the packet is processed by the additional entities.

In order to use a flow cache for packets with dynamic headers, certain techniques described herein involve regulating flow cache processing such that a flow cache is only used either before or after a packet's header changes. For an inbound packet that is encrypted, for example, embodiments include performing "slow path" processing on the packet until it is decrypted, and then performing "fast path" processing on the packet using the flow cache with the decrypted packet. For an outbound packet that requires encryption (or a packet that is to be dispatched to another entity that may modify the packet's header), embodiments include ensuring that "fast path" processing on the packet is completed before the packet is encrypted or otherwise modified by additional entities.

In this specification, the terms "logical network entity," "logical network element," and the like will refer to software defined networking (SDN) logical overlay network features. The terms, "virtual entities" and the like will refer to software-implemented networking services that reside individually or in a distributed manner on a plurality of physical host computers and may handle logical overlay or physical underlay network traffic. In so doing, virtual entities, which include software-implemented switches, routers, tunnel endpoints, network filters/firewalls, etc., implement policies for the overlay software-defined network.

It is noted that, while certain embodiments are described with respect to SDN systems, techniques described herein may also be performed in other types of systems, such as physical networking systems. Furthermore, while certain embodiments are described with respect to gateways, other types of computing components may perform techniques described herein.

Figure 1:
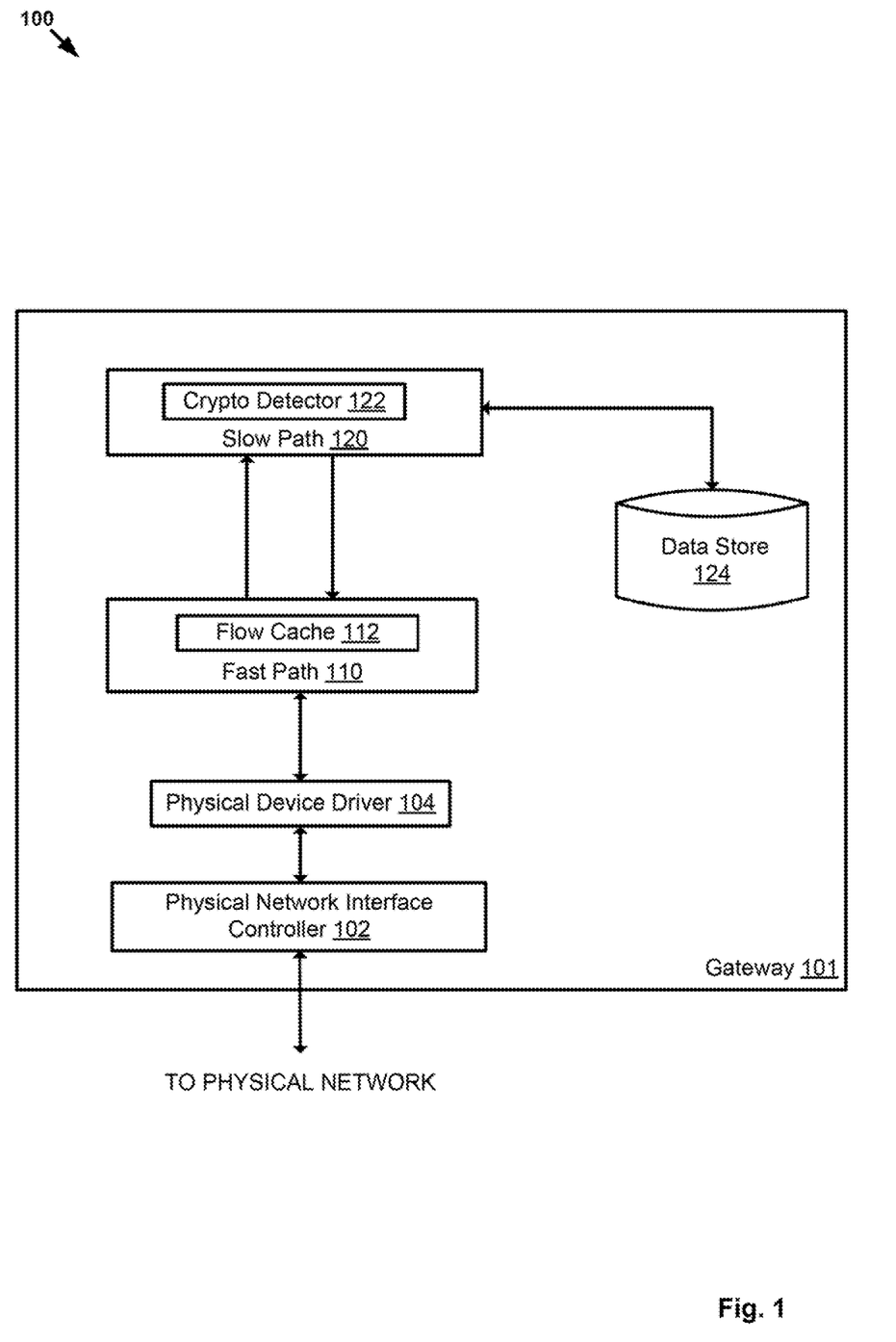
FIG. 1 illustrates a gateway in a networking environment according to embodiments of the present disclosure.

FIG. 1 is a block diagram illustrating a gateway in a networking environment 100 according to embodiments of the present disclosure. As shown, networking environment 100 includes a gateway 101 that is connected to a physical network via a physical network interface controller (PNIC) 102. For example, gateway 101 may be a computing node that serves as the entry point to a data center network (e.g., which may be an SDN) and facilitates and regulates traffic between the datacenter network and the external physical network. PNIC 102 is connected to a physical device driver 104 that serves as an interface between the PNIC 102 and software components, such as an operating system running on gateway 101. Physical device driver 104 allows fast path 110 and slow path 120 processes to communicate over the network via PNIC 102.

In some embodiments, some of the resources of gateway 101 are provided by one or more computing devices serving as host machines. For example, the one or more host machines may operate virtualization software that allows these host machines to host various virtual computing instances, such as virtual machines (VMs). In some embodiments, for example, gateway 101 may be a virtual machine or a physical computer system, and fast path 110 and/or slow path 120 are provided by one or more processes running on gateway 101, either in operating system kernel space and/or user space. In the case where gateway 101 is a virtual machine, then PNIC 102 is a virtual NIC (VNIC) and physical device driver 104 is the device driver for the VNIC.

Fast path 110 generally comprises one or more components that perform operations related to processing inbound and outbound packets, such as operations related to using a flow cache 112, as described herein. Flow cache 112 generally includes results of previous packet operations (e.g., actions determined by slow path 120) so that the results may be reapplied to subsequent packets that meet certain criteria. For example, each entry in flow cache 112 may correspond to a flow (e.g., a series of packets having the same five-tuple of source IP (internet protocol) address, destination IP address, source port, destination port, and transport protocol), and may include a series of actions to be performed for all packets in the flow (e.g., all packets that match the five-tuple). In other words, fast path 110 creates an entry in flow cache 112 based on the results of slow path 120 for the first packet in a flow (e.g., the entry may comprise information from the header of the packet, such as the five-tuple, and the actions to be performed for the packet), and then matches subsequent packets in the flow with the entry in flow cache 112 based on information in the header of each packet (e.g., the five-tuple). A "cache hit" generally refers to a match between information in a packet header and an entry in flow cache 112, while a "cache miss" generally refers to a determination that there is no entry in flow cache 112 corresponding to a particular packet. A cache miss in fast path 110 generally leads to a packet being passed to slow path 120.

Slow path 120 generally comprises one or more components that perform operations related to processing inbound and outbound packets, such as operations related to determining actions to perform for a packet based on information in the packet, as described herein. For example, slow path 120 may comprise a pipeline made up of multiple stages, each stage of the pipeline corresponding to a packet-processing logical entity in a logical network, such as a logical router, logical switch, firewall, etc., and the next stage identified by the packet-processing at each stage corresponds to the next hop of the packet in the logical network, the next hop being another logical entity.

In some embodiments, slow path 120 uses information (e.g., configuration information, rules, and the like) in data store 124 to determine actions to perform for a packet (e.g., firewall operations, NAT operations, and others). Slow path 120 includes crypto detector 122, which performs operations related to determining whether a packet requires encryption or decryption. In certain embodiments, a packet arrives at slow path 120 (e.g., after a cache miss in fast path 110), and slow path 120 determines, using crypto detector 122, that the packet is encrypted. For example, crypto detector 122 may perform a policy lookup to determine whether a packet is associated with an IPSec encryption protocol, or may determine that the packet has an encryption header indicating that the packet is encrypted. If a packet is encrypted, slow path 120 decrypts the packet (e.g., by providing the packet to a component that performs decryption). Upon determining that a packet is encrypted, slow path 120 also "cancels" any information recorded for flow cache 112 with respect to the packet. This is because any information recorded up to this point (e.g., any header information parsed from the encrypted packet or any actions determined for the packet based on the encrypted version of the packet) is only relevant to the encrypted version of the packet. Having canceled (e.g., deleted) any recorded flow cache information, and having decrypted the packet, slow path 120 provides the packet to fast path 110 for flow cache processing. Now decrypted, the packet can be fully parsed by fast path 110, and used with flow cache 112.

If crypto detector 122 determines that a packet requires encryption, then slow path 120 returns the packet to fast path 110 to complete flow cache processing prior to performing encryption. This is because any flow cache processing performed on the packet after encryption is only relevant to the encrypted version of the packet. Similarly, if slow path 120 otherwise determines that the packet has a dynamic header (e.g., if the packet will be provided to an entity that may change the header of the packet), then slow path 120 returns the packet to fast path 110 to complete flow cache processing for the packet before the header is changed (e.g., before the packet is passed to an entity that may change the header). For packets that will be encrypted or otherwise passed to an entity that may modify header information, an action is added to the entry for the packet in flow cache 112 corresponding to the encryption or other modification. For example, an enqueue action to a crypto component may be added to the entry for the packet in flow cache 112 (e.g., an action to add the packet to a queue of a component that performs encryption). In certain embodiments, if a packet is to be encrypted or otherwise modified, an additional flow cache 112 entry may be made for the packet based only on the outer header of the packet.

As used herein, "flow cache processing" generally refers to the process of comparing information in a packet header to entries in flow cache 112 to determine a cache hit or cache miss. In the event of a cache miss, flow cache processing generally further includes determining, by slow path 120, actions to perform for the packet and writing an entry to flow cache 112 that includes information from the packet header and the actions to perform for the packet. In the event of a cache hit, flow cache processing generally further includes retrieving the actions to perform for the packet from flow cache 112 and, in certain embodiments, performing the actions.

In certain embodiments, an entry in flow cache 112 comprises a key-value pair, where the information from the header of a packet (e.g., the five-tuple) is the key and the actions to perform for the packet are the value. For example, the value may be a hash that is based on the actions (e.g., based on identifiers of the actions), and the key may solve the hash.

It is noted that, while certain components are depicted and described with respect to FIG. 1 as performing particular operations, other arrangements are possible. For example, crypto detector 122 may not be a separate component within slow path 120, and the need for encryption or decryption may instead be determined in the process of performing other operations by slow path 120 or fast path 110. Furthermore, encryption is only included as one example of why a packet may have a dynamic header, and techniques described herein may be used in other cases where a packet's header is obscured or inconsistent over time.

Embodiments described herein constitute an improvement over previous flow cache techniques, as they allow for the effective use of a flow cache for packets with dynamic headers, such as packets that require decryption or encryption. As such, techniques described herein allow for the efficiency provided by a flow cache to be achieved in a broader array of circumstances, thereby improving the performance of computing systems involved. For example, the ability to utilize a flow cache even in cases where a packet's header changes may reduce the usage of processing and communication resources (e.g., by avoiding redundant slow path processing for encrypted packets in a flow, including unnecessary access to data stores to determine actions for packets), and thereby reduce congestion and bottlenecks.

Figure 2:
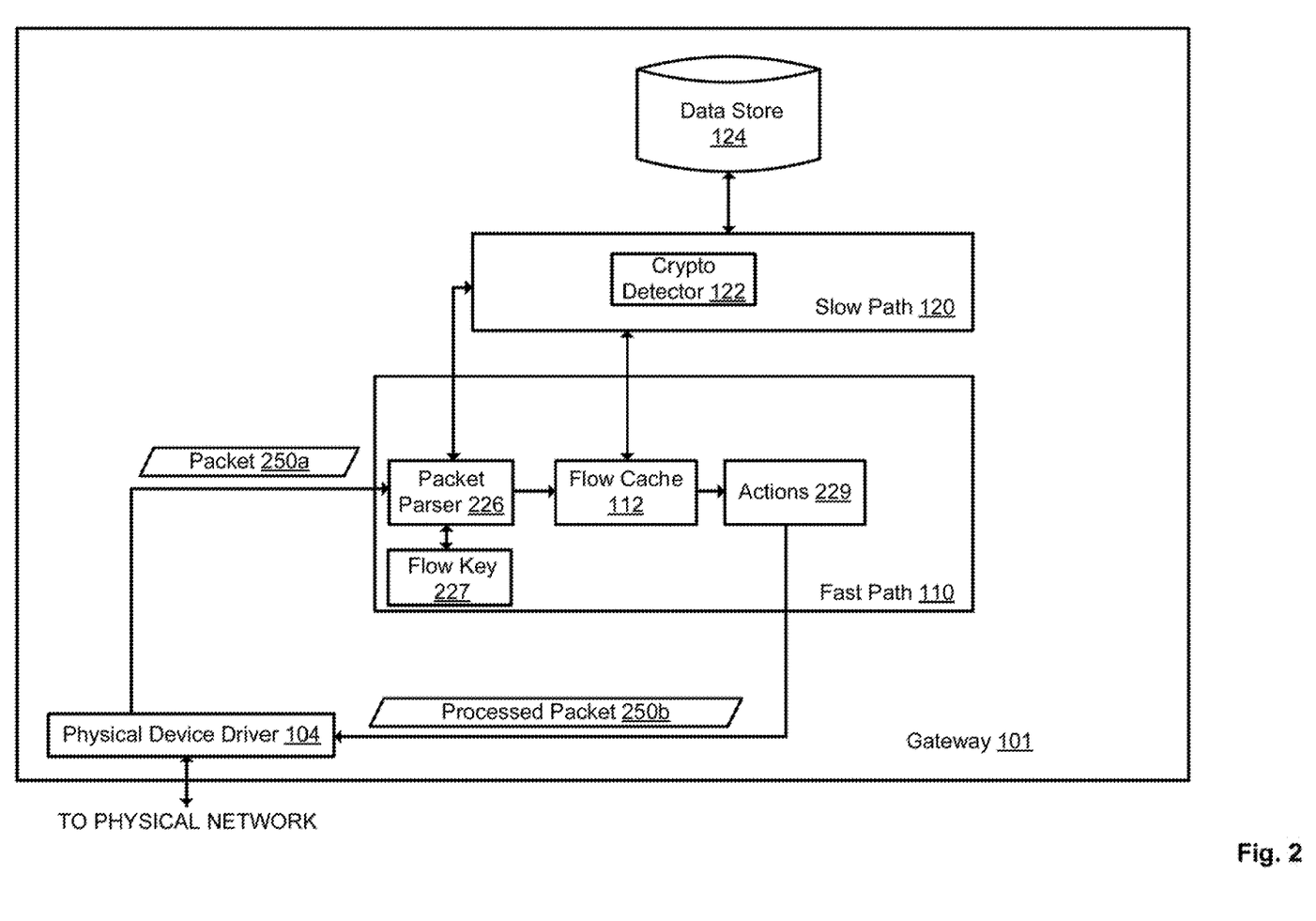
FIG. 2 illustrates components of a gateway according to embodiments of the present disclosure.
Figure 3:
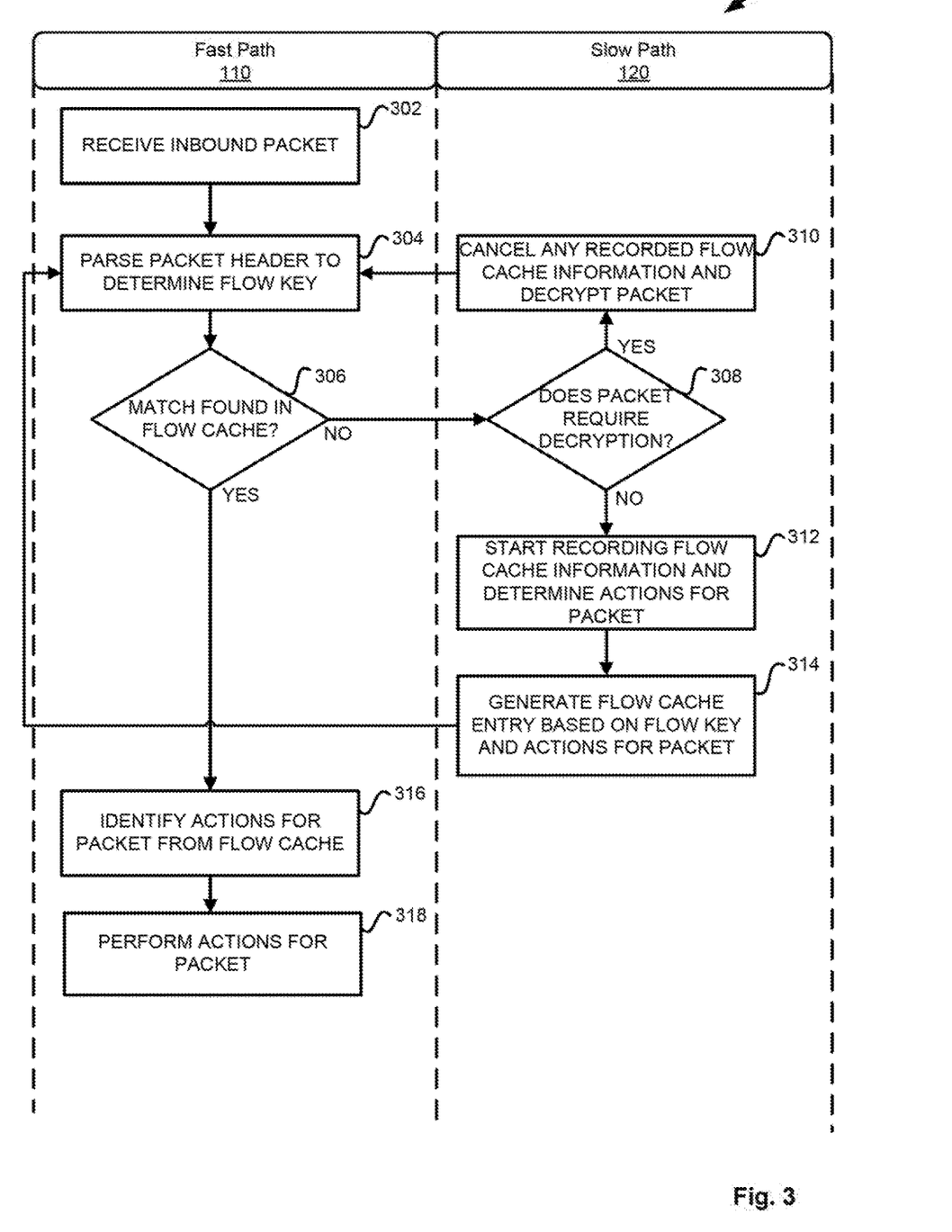
FIG. 3 illustrates operations for processing an inbound packet according to embodiments of the present disclosure.

FIG. 2 illustrates components of a gateway according to embodiments of the present disclosure, and is described with respect to FIG. 3, which illustrates operations for processing an inbound packet according to embodiments of the present disclosure. Various components depicted in FIGS. 2 and 3 may be the same as components depicted in FIG. 1, such as physical device driver 104, fast path 110, flow cache 112, slow path 120, crypto detector 122, and data store 124.

At step 302 in FIG. 3, an inbound packet is received at fast path 110. For example, with respect to FIG. 2, packet 250a is received via physical device driver 104 from the physical network, and provided to fast path 110, where it is received by packet parser 226.

At step 304, fast path 110 parses the header of the packet to determine a flow key. For example, with respect to FIG. 2, packet parser 226 retrieves information from the header of packet 250a (e.g., source IP, destination IP, source port, destination port, and transport protocol) and determines a flow key 227 for packet 250a based on the information. In some embodiments, flow key 227 is a five tuple.

At step 306, fast path 110 determines whether a match is found for the flow key in a flow cache. For example, with respect to FIG. 2, fast path 110 compares flow key 227 to entries in flow cache 112 to determine whether there is a cache hit or a cache miss. In the event of a cache miss, operations continue to step 308. Otherwise, operations continue to step 316. A cache miss may occur if, for example, the packet is the first packet of a flow. A cache miss may also occur if the packet is encrypted, as the encrypted data in the packet's header (e.g., in the packet's inner header) will not match any flow cache entries.

At step 308, upon a cache miss, slow path 120 determines whether the packet requires decryption. For example, with respect to FIG. 2, crypto detector 122 of slow path 120 determines whether packet 250a requires decryption, such as by looking for an encryption header in packet 250a or by performing a policy lookup for packet 250a. If the packet requires decryption, operations continue at step 310. Otherwise, operations continue at 312. A packet may require decryption if, for example, it has an IPSec header indicating that it is encrypted.

At step 310, upon determining that the packet requires decryption, slow path 120 cancels any recorded flow cache information and decrypts the packet. For example, with respect to FIG. 2, slow path 120 deletes flow key 227 and any action information that has been determined based on the encrypted packet 250a (e.g., if any actions have been determined for the packet up to this point) and provides packet 250a to a decryption component to be decrypted (e.g., according to an IPSec protocol determined at step 308). For example, all crypto operations (e.g., encryption or decryption) may be offloaded to separate components (e.g., software cryptos or hardware crypto accelerators) to improve performance. After the packet is decrypted, operations return to step 304, where the packet header is again parsed to determine a new flow key, and then operations proceed to step 306, where it is determined whether the new flow key matches an entry in the flow cache. A cache miss may occur after the packet has been decrypted if, for example, the packet is the first packet of a flow. As such, operations would continue at step 308, at which point it would be determined that the packet does not require decryption (e.g., because the packet is already decrypted), and operations would continue at step 312.

At step 312, having determined that the packet does not require decryption, slow path 120 starts recording of flow cache information and determines actions to perform for the packet. For example, with respect to FIG. 2, slow path 120 may use information in data store 124 to determine the actions, and may capture information related to the actions for use in a flow cache entry for the flow to which the packet belongs. Determining actions to perform for a packet based on configuration information in a data store is described in U.S. patent application, entitled "DATAPATH CACHE,", which was previously referenced.

At step 314, having determined the actions to perform for the packet, slow path 120 generates a flow cache entry based on the flow key and the actions for the packet (e.g., the actions that were recorded at step 312). For example, with respect to FIG. 2, slow path 120 may record the actions determined based on information in data store 124, along with the flow key 227 in an entry to be stored in flow cache 112. In some embodiments, slow path 120 writes the entry to flow cache 112, while in other embodiments slow path returns processing to fast path 110 and fast path 110 writes the entry to flow cache 112. Operations then return to step 304, where the packet header is again parsed to determine a new flow key, and then operations proceed to step 306, where it is determined whether the new flow key matches an entry in the flow cache. A cache hit may occur if, for example, an entry has been written to the flow cache for this packet (e.g., if operations have returned to step 304 following step 314) or if the packet is a subsequent packet in a flow that already has an entry in the flow cache.

At step 316, upon a cache hit, fast path 110 determines the actions to perform for the packet based on the flow cache entry. For example, with respect to FIG. 2, fast path 110 may retrieve the actions 229 for packet 250*a* from flow cache 112 based on flow key 227. Operations then continue to step 318.

At step 318, the actions for the packet that were determined at step 316 are performed. For example, with respect to FIG. 2, fast path 110 performs actions 229 on packet 250*a* in order to produce processed packet 250*b*, which may then be distributed via physical device driver 104 to the network.

It is noted that, while the operations described above with respect to FIGS. 1 and 2 focus on inbound packets, techniques described herein may also be applied to outbound packets. For example, if packet 250*a* is an outbound packet that requires encryption (e.g., determined based on a policy lookup) or is to be provided to an element that may otherwise modify the header of packet 250*a*, then flow cache processing is completed for packet 250*a* before it is encrypted or otherwise modified. In certain embodiments, an action is added to an entry in flow cache 112 for encrypting or performing another operation that may modify the packet's header. For example, the action added to the flow cache entry may be an enqueue action for performing encryption. Furthermore, in some embodiments, an additional flow cache entry may be added for the packet that has a key based only on the packet's outer header (e.g., so that the packet may be processed based on the flow cache when the packet returns from being encrypted).

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for using a flow cache with packets comprising dynamic headers, the method comprising:
    receiving a packet of a packet flow from a network;
    parsing the packet in order to determine a flow key;
    comparing the flow key to entries in the flow cache;
    upon determining that the flow key does not match any of the entries:
        determining whether the packet is subject to additional processing capable of changing a header of the packet; and upon determining that the packet is not subject to additional processing capable of changing the header of the packet:
    determining one or more actions to perform for the packet; and
    generating an entry for the packet in the flow cache comprising the flow key and the one or more actions; or
upon determining that the packet is subject to additional processing capable of changing the header of the packet:
    canceling recorded flow cache information for the packet;
    performing the additional processing on the packet;
    re-parsing the packet in order to determine a new flow key; and
    comparing the new flow key to the entries in the flow cache; or
upon determining that the flow key matches an entry of the entries:
    determining cached actions to perform for the packet based on the entry; and
    performing the cached actions on the packet.

2. The method of claim 1, wherein determining whether the packet is subject to additional processing capable of changing the header of the packet comprises determining whether the packet has an encryption header, and wherein the additional processing comprises a decryption operation.

3. The method of claim 2, wherein the decryption operation is offloaded to a separate component.

4. The method of claim 2, wherein the encryption header comprises an internet protocol security (IPSec) header.

5. The method of claim 1, wherein canceling the recorded flow cache information for the packet comprises deleting the flow key.

6. The method of claim 1, wherein each entry of the entries in the flow cache comprises a key-value pair that identifies certain actions to perform for a certain packet flow.

7. The method of claim 1, wherein the flow key comprises a source IP address, a destination IP address, a source port, a destination port, and a transport protocol, and wherein the flow key is determined based on a header of the packet.

8. A system, comprising: one or more processors; and a non-transitory computer-readable medium comprising instructions that, upon execution, cause the one or more processors to perform an operation for using a flow cache with packets comprising dynamic headers, the operation comprising:
    receiving a packet of a packet flow from a network;
    parsing the packet in order to determine a flow key;
    comparing the flow key to entries in the flow cache; and
    upon determining that the flow key does not match any of the entries:
        determining whether the packet is subject to additional processing capable of changing a header of the packet;
        upon determining that the packet is not subject to additional processing capable of changing the header of the packet:
            determining one or more actions to perform for the packet; and
            generating an entry for the packet in the flow cache comprising the flow key and the one or more actions; or
        upon determining that the packet is subject to additional processing capable of changing the header of the packet:
            canceling recorded flow cache information for the packet;
            performing the additional processing on the packet;
            re-parsing the packet in order to determine a new flow key; and
            comparing the new flow key to the entries in the flow cache; or
    upon determining that the flow key matches an entry of the entries:
        determining cached actions to perform for the packet based on the entry; and
        performing the cached actions on the packet.

9. The system of claim 8, wherein determining whether the packet is subject to additional processing capable of changing the header of the packet comprises determining whether the packet has an encryption header, and wherein the additional processing comprises a decryption operation.

10. The system of claim 9, wherein the decryption operation is offloaded to a separate component.

11. The system of claim 9, wherein the encryption header comprises an internet protocol security (IPSec) header.

12. The system of claim 8, wherein canceling the recorded flow cache information for the packet comprises deleting the flow key.

13. The system of claim 8, wherein each entry of the entries in the flow cache comprises a key-value pair that identifies certain actions to perform for a certain packet flow.

14. The system of claim 8, wherein the flow key comprises a source IP address, a destination IP address, a source port, a destination port, and a transport protocol, and wherein the flow key is determined based on a header of the packet.

15. A non-transitory computer-readable medium comprising instructions that, upon execution, cause one or more processors to perform an operation for using a flow cache with packets comprising dynamic headers, the operation comprising:
    receiving a packet of a packet flow from a network;
    parsing the packet in order to determine a flow key;
    comparing the flow key to entries in the flow cache; and
    upon determining that the flow key does not match any of the entries:
        determining whether the packet is subject to additional processing capable of changing a header of the packet;
        upon determining that the packet is not subject to additional processing capable of changing the header of the packet:
            determining one or more actions to perform for the packet; and
            generating an entry for the packet in the flow cache comprising the flow key and the one or more actions; or
        upon determining that the packet is subject to additional processing capable of changing the header of the packet:
            canceling recorded flow cache information for the packet;
            performing the additional processing on the packet;
            re-parsing the packet in order to determine a new flow key; and
            comparing the new flow key to the entries in the flow cache; or
    upon determining that the flow key matches an entry of the entries:
        determining cached actions to perform for the packet based on the entry; and
        performing the cached actions on the packet.

16. The non-transitory computer-readable medium of claim 15, wherein determining whether the packet is subject to additional processing capable of changing the header of the packet comprises determining whether the packet has an encryption header, and wherein the additional processing comprises a decryption operation.

17. The non-transitory computer-readable medium of claim 16, wherein the decryption operation is offloaded to a separate component.

18. The non-transitory computer-readable medium of claim 16, wherein the encryption header comprises an internet protocol security (IPSec) header.

19. The non-transitory computer-readable medium of claim 15, wherein canceling the recorded flow cache information for the packet comprises deleting the flow key.

20. The non-transitory computer-readable medium of claim 15, wherein each entry of the entries in the flow cache comprises a key-value pair that identifies certain actions to perform for a certain packet flow.

* * * * *